(No Model.)
A. MESSMER.
BREAD IRONS.
No. 244,913.  Patented July 26, 1881.
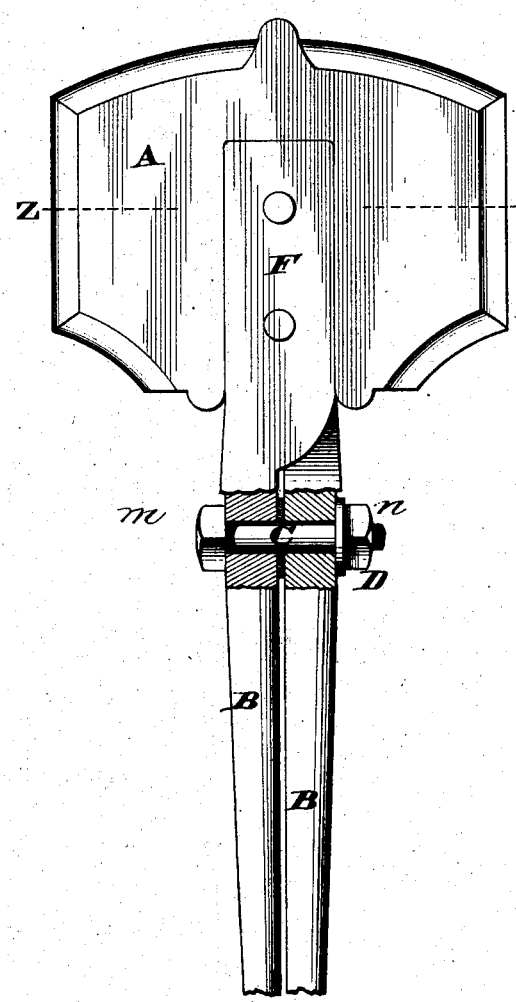
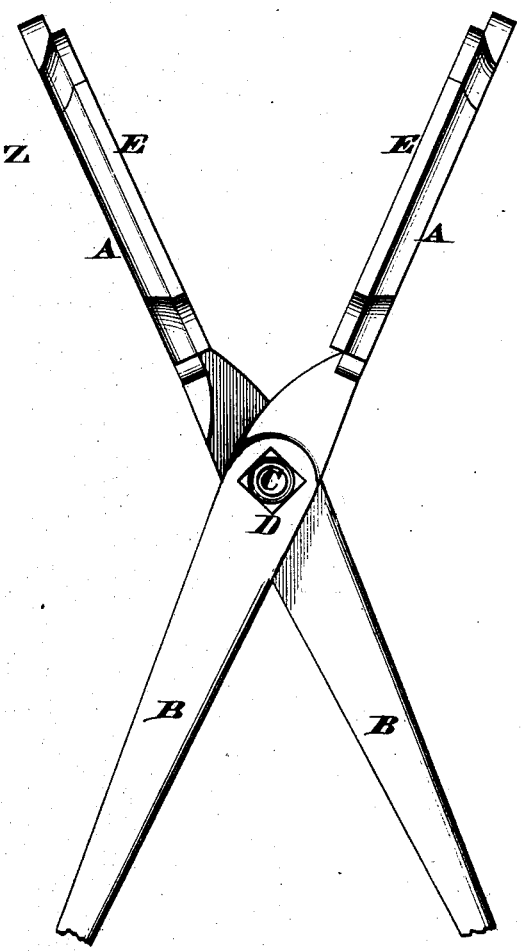
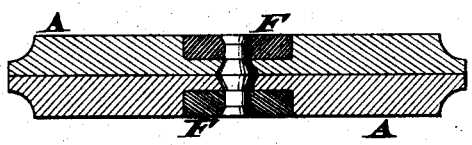
Attest,
Jeremiah F. Turlu,
Gustave A. Meyers
Inventor.
Andrew Messmer,
by Steyn & Beck
his Attys.

UNITED STATES PATENT OFFICE.

ANDREW MESSMER, OF CINCINNATI, OHIO.

BREAD-IRON.

SPECIFICATION forming part of Letters Patent No. 244,913, dated July 26, 1881.

Application filed May 10, 1881. (No model.)

*To all whom it may concern:*

Be it known that I, ANDREW MESSMER, a citizen of the United States, residing at Cincinnati, in the county of Hamilton and State of Ohio, have invented a new and useful Improvement in Bread-Irons, of which the following is a specification.

My invention relates chiefly to irons adapted for making bread for use in churches, which is commonly known as "altar-bread," and the novelty consists in so attaching the tongs to the baking-irons as to secure an even and uniform baking.

The irons heretofore in use have had the tongs fastened to them in such manner that an uneven surface would be presented to the heat—that is to say, the tongs at the point of attachment would be higher than the surface of the irons, in consequence of which the heat would not be evenly distributed, thus causing part of the bread to be more quickly and thoroughly baked than the other, and necessitating much trouble and annoyance. To obviate these defects I attach the tongs to the baking-irons in such a manner that they will be flush and on a line even with the surface of the irons. This will enable the heat to be evenly distributed on the baking-irons and secure a uniform baking of the bread with little or no trouble.

To more fully illustrate my invention, I will refer to the accompanying drawings, forming a part of my application.

Figure 1 is a front view of the baking-irons, showing the tongs attached as described. Fig. 2 is a side view of the tongs and baking-irons, showing the latter in a separated position. Fig. 3 is a section of the baking-irons and tongs through the line Z Z, Fig. 1, which is designed to illustrate the method by which the tongs are fastened to the irons by means of the rivets.

A A are the baking-irons; B B, the tongs. C is the bolt joining the tongs, which acts as a pivot upon which they turn, fastened by the nut D. E E are the faces of the baking-irons, upon which the batter is laid. These faces may be perfectly plain and smooth, or may have engraved upon them some fanciful or religious design, which is imparted to the bread when baked.

In the back of the baking-iron a portion of the metal is cut away, so as to secure the end of the arm of the tongs, as shown at F in Fig. 1, the arm of the tongs being thus sunk into the back of the baking-iron, the back of it coming flush with the surface of the iron. These tongs may, if desired, be inserted in the irons and fastened by a screw-thread; but I prefer the method shown in the drawings.

In order to prevent the pivot C from being displaced by the working of the tongs, and thereby throwing the baking-irons out of their proper adjustment, the effect of which is obvious, I cut out a small portion of the metal under the bolt-head $m$ and the nut $n$, as seen in Fig. 1. This affords a level surface for the bolt-head, nut, and their washers to work against, and prevents the respective parts from getting loose, and holds them to the line desired.

In the drawings I show the tongs fastened to the baking-irons by rivets countersunk therein; but I do not limit myself to this method, as any other desirable means may be employed.

Having thus described my invention, what I claim, and desire to secure, is—

1. In bread-irons, the tongs fastened to the back of the same in such manner as to be flush with the surface of the irons, the whole presenting an even surface, substantially as and for the purpose described 2. The combination of bread-irons and tongs constructed as described, and presenting an even and unbroken surface to the heat, for the purpose set forth.

ANDREW MESSMER.

Witnesses:
JEREMIAH F. TWOHIG,
GUSTAVE A. MEYER.